(12) United States Patent
Hu et al.

(10) Patent No.: US 12,588,035 B2
(45) Date of Patent: Mar. 24, 2026

(54) BLIND DECODING FOR REDUCED CAPABILITY DEVICES

(71) Applicant: ZTE Corporation, Shenzhen (CN)

(72) Inventors: Youjun Hu, Shenzhen (CN); Bo Dai, Shenzhen (CN); Luanjian Bian, Shenzhen (CN); Huiying Fang, Shenzhen (CN); Weiwei Yang, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 492 days.

(21) Appl. No.: 17/873,641

(22) Filed: Jul. 26, 2022

(65) Prior Publication Data

US 2023/0180261 A1 Jun. 8, 2023

Related U.S. Application Data

(63) Continuation of application No. PCT/CN2020/121089, filed on Oct. 15, 2020.

(51) Int. Cl.
*H04W 72/232* (2023.01)

(52) U.S. Cl.
CPC ................................ *H04W 72/232* (2023.01)

(58) Field of Classification Search
CPC ..... H04W 48/16; H04W 72/232; Y02D 30/70
See application file for complete search history.

(56) References Cited

U.S. PATENT DOCUMENTS

| | | | |
|---|---|---|---|
| 10,271,321 B1 | 4/2019 | Patel et al. | |
| 2019/0191424 A1* | 6/2019 | Wang | H04W 72/23 |
| 2019/0334687 A1* | 10/2019 | Su | H04L 5/0053 |
| 2022/0132425 A1* | 4/2022 | Seo | H04W 52/02 |
| 2022/0201515 A1* | 6/2022 | Chatterjee | H04L 5/0091 |

FOREIGN PATENT DOCUMENTS

| | | |
|---|---|---|
| CN | 101809898 A | 8/2010 |
| WO | WO 2018/128468 A1 | 7/2018 |
| WO | WO 2020/166925 A1 | 8/2020 |

OTHER PUBLICATIONS

Huawei, HiSilicon, "Remaining issues on search space", 3GPP TSG RAN WG1 Meeting #92, R1-1801335, Feb. 26, 2018 (3 pages).
(Continued)

*Primary Examiner* — Mahran Y Abu Roumi
(74) *Attorney, Agent, or Firm* — Crowell & Moring LLP

(57) ABSTRACT

This document generally relates to wireless communication schemes that include setting or determining PDCCH detection attempt parameters by setting or determining at least one of: a total DCI monitoring number, a specific DCI monitoring number, a non-overlapped CCE number, an aggregation level number, or a total PDCCH detection attempt number. The PDCCH detection attempt parameters may correspond to a reduced maximum number of PDCCH candidates per slot per serving cell, and/or a maximum number of non-overlapped CCEs per slot per serving cell. User devices, including reduced capability UEs, may utilize the PDCCH detection attempt parameters when detecting or blindly decoding PDCCH candidates.

16 Claims, 2 Drawing Sheets

100

(56) References Cited

OTHER PUBLICATIONS

Ericsson, "Reduced PDCCH monitoring for Redcap" 3GPP TSG RAN WG1 #101, R1-2003290, May 25, 2020 (10 pages).

Ericsson, "Reduced PDCCH monitoring for RedCap", 3GPP TSG-RAN WG1 Meeting #102-e e-Meeting, R1-2005235, Aug. 17, 2020 (11 pages).

Huawei, HiSilicon, "Power saving for reduced capability devices", 3GPP TSG RAN WG1 Meeting #102-e E-meeting, R1-2005270, Aug. 17, 2020 (7 pages).

Huawei et al. "NB-PDCCH search space", *3GPP TSG RAN WG1 NB-IoT Ad-Hoc Meeting*, R1-160029, Jan. 20, 2016, section 3 (3 pages).

International Search Report and Written Opinion for International Application No. PCT/CN2020/121089 mailed Jul. 15, 2021 (7 pages).

European Search Report for Application No. 20957105.8 mailed Jul. 18, 2023 (8 pages).

Sequans, "Reduced PDCCH monitoring for RedCap UE" 3GPP TSG RAN WG1 #102-e, R1-2006683, Aug. 17, 2020 (2 pages).

Spreadtrum Communications, "Discussion on reduced PDCCH monitoring", 3GPP TSG RAN WG1 #102, R1-2006286, Aug. 17, 2020 (4 pages).

Ericsson, "Reduced PDCCH monitoring for Redcap", 3GPP TSG RAN WG1 #101, R1-2003290, May 25, 2020 (9 pages).

* cited by examiner

200

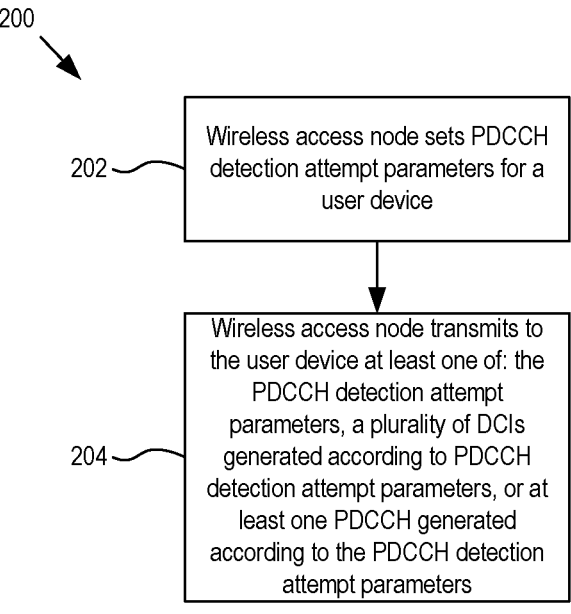

202 — Wireless access node sets PDCCH detection attempt parameters for a user device 204 — Wireless access node transmits to the user device at least one of: the PDCCH detection attempt parameters, a plurality of DCIs generated according to PDCCH detection attempt parameters, or at least one PDCCH generated according to the PDCCH detection attempt parameters

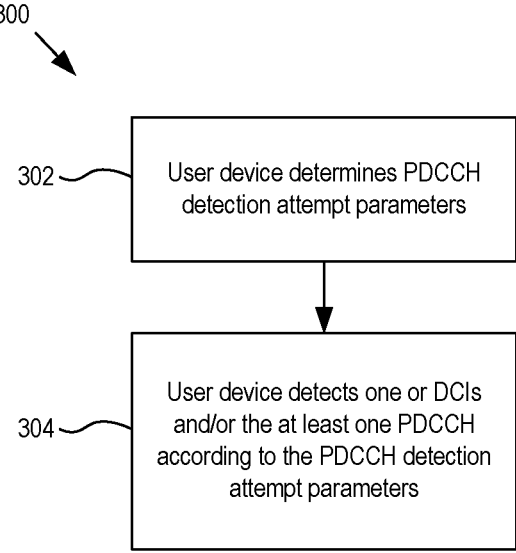

302 — User device determines PDCCH detection attempt parameters

304 — User device detects one or DCIs and/or the at least one PDCCH according to the PDCCH detection attempt parameters

FIG. 3

BLIND DECODING FOR REDUCED CAPABILITY DEVICES

CROSS-REFERENCE TO RELATED APPLICATIONS

This application is a continuation of International Application No. PCT/CN2020/121089, filed Oct. 15, 2020. The contents of International Application No. PCT/CN2020/121089 are herein incorporated by reference in their entirety.

TECHNICAL FIELD

This document is directed generally to wireless communications.

BACKGROUND

In existing 5G new radio (NR) access technology communication systems, the user equipment (UE) needs to know the uplink scheduling grant information for sending physical uplink shared channel (PUSCH) and the downlink scheduling allocation information for receiving. This information is included in downlink control information (DCI) that is sent from a base station to the UE on the physical downlink control channel (PDCCH). Accordingly, the UE monitors the PDCCH for the DCI. However, monitoring the PDCCH consumes power. As such, ways to reduce UE power consumption in connection with PDCCH monitoring may be desirable.

SUMMARY

This document relates to methods, systems, and devices for wireless communication. In some implementations, a method for wireless communication, includes: setting, by a wireless access node, physical downlink control channel (PDCCH) detection attempt parameters for a user device by at least one of: setting a total downlink control information (DCI) monitoring number no larger than a predetermined maximum total DCI monitoring number; setting a specific DCI monitoring number no larger than a predetermined maximum specific DCI monitoring number; setting a number of non-overlapped channel control elements (CCEs) for the user device to monitor no larger than a predetermined maximum number of CCEs for the user device to monitor; setting an aggregation level number for a set of aggregation levels no larger than a configured aggregation level number; setting a total PDCCH detection attempt number no larger than a predetermined maximum total PDCCH detection attempt number; or transmitting, by the wireless access node to the user device, at least one of: the PDCCH detection attempt parameters; one or more DCIs, according to the PDCCH detection attempt parameters; or at least one PDCCH according to the PDCCH detection attempt parameters.

In other implementations, a method for wireless communication, includes: determining, by a user device, physical downlink control channel (PDCCH) detection attempt parameters including at least one of: determining a total downlink control information (DCI) monitoring number no larger than a predetermined maximum total DCI monitoring number; determining a specific DCI monitoring number no larger than a predetermined maximum specific DCI monitoring number; determining a number of non-overlapped channel control elements (CCEs) for the user device to monitor no larger than a predetermined maximum number of CCEs for the user device to monitor; determining an aggregation level number for a set of aggregation levels no larger than a configured aggregation level number; determining a total PDCCH detection attempt number no larger than a predetermined maximum total PDCCH detection attempt number; or detecting, by the wireless access node to the user device, at least one of: one or more DCIs, according to the PDCCH detection attempt parameters; or at least one PDCCH according to the PDCCH detection attempt parameters.

In some other implementations, a device, such as a network device, is disclosed. The device may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above and other aspects and their implementations are described in greater detail in the drawings, the descriptions, and the claims.

BRIEF DESCRIPTION OF THE DRAWINGS

FIG. 2 is a flow chart of an example of a wireless communication method.

FIG. 3 is a flow chart of another example of a wireless communication method.

DETAILED DESCRIPTION

Figure 1:
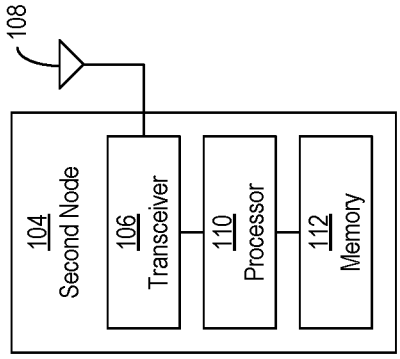
FIG. 1 shows an example of a wireless communication system.

In further detail, FIG. 1 shows a diagram of an example wireless communication system 100 including a plurality of communication nodes that are configured to wirelessly communicate with each other. The communication nodes include a first node 102 and a second node 104. Various other examples of the wireless communication system 100 may include more than two communication nodes.

In general, each communication node is an electronic device, or a plurality (or network or combination) of electronic devices, that is configured to wirelessly communicate with another node in the wireless communication system, including wirelessly transmitting and receiving signals. In various embodiments, each communication node may be one of a plurality of types of communication nodes.

One type of communication node is a user device. A user include a single electronic device or apparatus, or multiple (e.g., a network of) electronic devices or apparatuses, capable of communicating wirelessly over a network. A user device may include or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples).

A second type of communication node is a wireless access node. A wireless access node may comprise one or more base stations or other wireless network access points capable of communicating wirelessly over a network with one or more user devices and/or with one or more other wireless access nodes. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, or network in various embodiments.

As shown in FIG. 1, each communication node 102, 104 may include transceiver circuitry 106 coupled to an antenna 108 to effect wireless communication. The transceiver circuitry 106 may also be coupled to a processor 110, which may also be coupled to a memory 112 or other storage device. The processor 110 may be configured in hardware (e.g., digital logic circuitry, field programmable gate arrays (FPGA), application specific integrated circuits (ASIC), or the like), and/or a combination of hardware and software (e.g., hardware circuitry (such as a central processing unit (CPU)) configured to execute computer code in the form of software and/or firmware to carry out functions). The memory 112, which may be in the form of volatile memory, non-volatile memory, combinations thereof, or other types of memory, may be implemented in hardware, and may store therein instructions or code that, when read and executed by the processor 110, cause the processor 110 to implement various functions and/or methods described herein. Also, in various embodiments, the antenna 108 may include a plurality of antenna elements that may each have an associated phase and/or amplitude that can be controlled and/or adjusted, such as by the processor 110. Through this control, a communication node may be configured to have transmit-side directivity and/or receive-side directivity, in that the processor 110, and/or the transceiver circuitry 106, can perform beam forming by selecting a beam from among a plurality of possible beams, and transmit or receive a signal with the antenna radiating the selected beam.

Additionally, in various embodiments, the communication nodes 102, 104 may be configured to wirelessly communicate with each other in or over a mobile network and/or a wireless access network according to one or more standards and/or specifications. In general, the standards and/or specifications may define the rules or procedures under which communication nodes 102, 104 can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR—U), as non-limiting examples.

In the wireless system 100, the communication nodes 102, 104 are configured to wirelessly communicate signals between each other. In general, a communication in the wireless system 100 between two communication nodes can be or include a transmission or a reception, and is generally both simultaneously, depending on the perspective of a particular node in the communication. For example, for a communication between the first node 102 and the second node 104, where the first node 102 is transmitting a signal to the second node 104 and the second node 104 is receiving the signal from the first node 102, the communication may be considered a transmission for the first node 102 and a reception for the second node 104. Similarly, where the second node 104 is transmitting a signal to the first node 102 and the first node 102 is receiving the signal from the second node 102, the communication may be considered a transmission for the second node 104 and a reception for the first node 102. Accordingly, depending on the type of communication and the perspective of a particular node, when a first node is communicating a signal with a second node, the node is either transmitting the signal or receiving the signal. Hereafter, for simplicity, communications between two nodes are generally referred to as transmissions.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways in order to communicate with each other, or otherwise controls how the communication nodes communicate data signals with each other. Also, particular signals can be characterized or defined as either an uplink (UL) signal or a downlink (DL) signal. An uplink signal is a signal transmitted from a user device to the wireless access node. A downlink signal is a signal transmitted from a wireless access node to a user device. Also, certain signals may defined or characterized by combinations of data/control and uplink/downlink, including uplink control signals, uplink data signals, downlink control signals, and downlink data signals.

For at least some specifications, such as 5G NR, data and control signals are transmitted and/or carried on physical channels. Generally, a physical channel corresponds to a set of time-frequency resources used for transmission of a signal. Different types of physical channels may be used to transmit different types of signals. Example types of physical channels include, but are not limited to, a physical downlink shared channel (PDSCH), a physical downlink control channel (PDCCH), a physical uplink shared channel (PUSCH), and a physical uplink control channel (PUCCH). In various embodiments of the communication system 100, the communication nodes use a PDSCH transmit downlink data signals, use a PDCCH to transmit downlink control signals, use a PUSCH to transmit uplink data signals, and use a PUCCH to transmit uplink control signals. As used herein for simplicity, unless specified otherwise, a particular type of physical channel is also used to refer to a signal that is transmitted on that particular type of physical channel. As an example illustration, a PDSCH refers to the physical downlink shared channel itself and/or to a signal transmitted on the PDSCH. Accordingly, a communication node transmitting or receiving a PDSCH means that the communication node is transmitting or receiving a signal on a PDSCH.

Additionally, for at least some specifications, such as 5G NR, one type of downlink control signal that a wireless access node transmits on PDCCH is or includes downlink control information (DCI). As used herein, a signal that includes downlink control information is generally referred to as a DCI signal or just DCI. Generally, a wireless access node transmits a DCI to a user device to provide the user device with the necessary information for proper reception, decoding, and demodulation of a downlink data signal received during a downlink data transmission, and for uplink scheduling grants that inform the user device about the resources and transport format to use for uplink data transmissions.

Additionally, a wireless access node may generate DCIs according to one or more DCI formats. Accordingly, each DCI may have an associated format, such that any two DCIs have the same DCI format as each other, or different DCI formats from each other. A wireless access node may use different DCI formats for conveying different types of information to the user device and/or for having the user device perform different functions related to DCIs. As examples, in 5G NR, DCI formats 1-0 and 1-1 are used for downlink scheduling assignments; DCI formats 0-0 and 0-1 are used for uplink scheduling grants; DCI format 2-0 is used for signaling slot format information (SFI) to a user device; DCI format 2-1 is used for signaling a preemption indicator to the user device; DCI format 2-2 is used for sending power-control commands; and DCI format 2-3 is used for power control of uplink sounding reference signals. DCI formats in addition to, or other than, those listed here may be possible.

In addition, each DCI has an associated size, such a number of bits. A size of a given DCI may be a total number of bits of the DCI, or may be a number of bits of a certain portion of the DCI, such as a payload portion of the DCI for example. In various embodiments, the sizes of the DCIs may depend on their DCI formats. That is, each DCI format may have an associated size. Any given two DCI formats may have the same size or have different sizes.

Additionally, in various embodiments, a DCI includes a payload portion of bits (or just payload) and a cyclic redundancy check (CRC) portion of bits (or just CRC) appended to the payload. For at least some embodiments, before transmitting a DCI, the wireless access node scrambles the CRC via a scrambling operation using a device identifier. In various embodiments, the device identifier is a radio-network temporary identifier (RNTI), such as a particular type of RNTI, in accordance with a specification such as 5G NR.

In various embodiments and/or in accordance with various specifications, such as 5G NR, the communication system 100 may use a plurality of different types of RNTIs for scrambling. One type of RNTI is a cell radio-network temporary identifier (C-RNTI), which uniquely identifies a user device. When a wireless access node wants only a certain user device to detect a given DCI, the wireless access node scrambles a CRC of the given DCI with a C-RNTI that uniquely identifies, or is otherwise uniquely associated with, the certain user device. In turn, only the user device having or identified by that C-RNTI can detect the given DCI. Other types of RNTIs may identify and/or be associated with a group of user devices. Non-limiting examples of such other types of RNTIs include a system information RNTI (SI-RNTI) for scheduling system information, a paging RNTI (P-RNTI) for transmission of paging messages, random access RNTI (RA-RNTI) for transmission of random-access, TPC-RNTI for uplink power control response, INT-RNTI for preemption indication, and slot format indicator RNTI (SFI-RNTI) for conveying slot-related information. A wireless access node may scramble a CRC of a given DCI with one of these other types of RNTIs for situations where the wireless access node wants the associated group of user devices to detect the given DCI.

Upon receipt of a DCI, a user device may perform a PDCCH detection attempt (also called a PDCCH decoding attempt) in which the user device attempts to detect (or decode) the received DCI. The user device performs a PDCCH detection attempt to determine if the DCI is correctly received, and/or if the user device is a node that the wireless access node intended to receive the DCI. A PDCCH detection attempt may be either successful or unsuccessful. If a PDCCH detection attempt is successful, then user device has detected the DCI, and in turn, determines that it has correctly received the DCI and/or that the wireless access node intended for the user device to receive the DCI. If the PDCCH detection attempt is unsuccessful, then the user device has not detected the DCI, and in turn, determines that it has not correctly received the DCI and/or the wireless access node did not intend for the user device to receive the DCI.

In particular embodiments, in a PDCCH detection attempt, the user device generates a scrambled CRC on the payload of the received DCI using the same scrambling operation performed by the wireless access node, and then compares the scrambled CRC against the received CRC. If the user device determines that the scrambled CRC it generated matches the received CRC, then the user device determines that the PDCCH detection attempt is successful. In addition, if the user device determines that the scrambled CRC it generated does not match the received CRC, then the user device determines that the PDCCH detection attempt is unsuccessful.

In addition, if the user device determines that the PDCCH detection attempt is successful, then the user device may continue to process the payload of the DCI, such as the scheduling assignment, scheduling grants, etc. In addition, if the user device determines that the PDCCH detection attempt is unsuccessful, then the user device may ignore the payload of the DCI.

Additionally, in accordance with some specifications, such as 5G NR, a wireless access code transmits DCIs to user devices in the form of PDCCH candidates. PDCCH candidates are transmitted in control resource sets (CORE-SETs). A CORESET is a time-frequency resource that spans a predetermined number (e.g., one, two, or three) contiguous orthogonal frequency division multiplexing (OFDM) symbols over multiple resource blocks (RBs). In addition, a PDCCH candidate is carried by a predetermined number of control channel elements (CCEs). Each CCE includes a predetermined number (e.g., six) of resource element groups (REGs), and each REG includes a predetermined number (e.g., twelve) of resource elements (REs) of one OFDM symbol.

In addition, the number of CCEs carrying a PDCCH candidate is referred to as an aggregation level (AL). In various embodiments, the communication system 100 may utilize a plurality of different predetermined aggregation levels, and in turn, a plurality of different predetermined numbers of CCEs for transmitting PDCCH candidates. Accordingly, each PDCCH candidate may be carried by a predetermined number of CCEs, and may be associated with the aggregation level that refers to that predetermined number of CCEs In addition, each aggregation level may have an associated aggregation level size. An aggregation level size of a given aggregation level is the number of CCEs associated with the given aggregation level. In generally, the larger the number of CCEs associated with a given aggregation level, the larger the size of the given aggregation level. Also, aggregation levels with greater AL sizes provide higher coverage. Additionally, as used herein unless specified otherwise, aggregation level sizes are used to identify the aggregation levels. As examples, AL1 identifies a first aggregation level associated with one CCE, AL2 identifies a second aggregation level associated with two CCEs, AL4 identifies a third aggregation level associated with four CCEs, AL8 identifies a fourth aggregation level associated with eight CCEs, and AL16 identifies a fifth aggregation level associated with sixteen CCEs. Number of aggregation levels and/or aggregation levels having other sizes in any of various configurations may be possible.

In order to detect one or more DCIs, a user device monitors for PDCCH candidates and performs PDCCH detection attempts on PDCCH candidates. In various embodiments, a user device performing PDCCH detection attempts on PDCCH candidates may also be referred to as blind detection attempts or blind decoding attempts, in that the user device may use any of various types of parameters (e.g., control channel element (CCE), aggregation levels, or any of various types of RNTIs) on a trial-and-error basis in order to successfully detect DCIs transmitted on candidate PDCCHs.

In addition, a user device may be configured to monitor for and/or perform PDCCH detection attempts on PDCCH candidates according to aggregation levels. In particular, a user device may be configured to monitor for and/or perform PDCCH detection attempts on PDCCH candidates for or over a set of one or more aggregation levels. In various embodiments, the aggregation levels in a set may have different sizes from each other. When a user device performs PDCCH detection attempts for a given aggregation level, the user device monitors for and/or performs detection attempts for PDCCH candidates and/or DCIs having a number of CCEs equal to the size of the given aggregation level. Additionally, a set of aggregation levels may have an associated detection order that identifies the order of aggregation levels according to which a user device performs PDDCH detection attempt. As example, a detection order of (AL1, AL2, AL4) indicates that a user device is to perform PDCCH detection attempts for AL1 first, and then perform PDCCH detection attempts for AL2 second, and then perform PDCCH detection attempts for AL4 third. A wireless access node may set a detection order in any of various ways. For example, a detection order of aggregation levels in a set may continuously increase in aggregation level size (starting with the smallest aggregation level size and ending with the largest aggregation level size), may continuously decrease in aggregation level size (starting with the largest aggregation level size and ending with the smallest aggregation level size), or may have a detection order in any of various other possible ways.

Additionally, each aggregation level may be associated with a number of PDCCH candidates or an associated individual PDDCH detection attempt number. When the user device is monitoring for or detecting PDCCH candidates for a given aggregation level, the associated PDDCH candidate number of PDDCH detection attempt number is a maximum number or limit of PDDCH detection attempts that the user device will perform for the given aggregation level. For example, if an individual PDCCH detection attempt number associated with AL1 is 16, then a user device will perform up to 16 PDCCH detection attempts when performing PDCCH detection attempts for AL 1.

In turn, a set of aggregation levels may have an associated or corresponding total PDCCH detection attempt number based on the individual PDDCH detection attempt numbers of the aggregation levels of the set. In particular, the total PDCCH detection attempt number of a set if the sum of the individual PDCCH detection attempt numbers of the set.

Additionally, when a user device performs PDDCH detection attempts for a set of aggregation levels, the user device may perform the PDDCH detection attempts according to the detection order until the user device successfully detects a DCI or PDCCH or until the user device reaches the total PDCCH detection attempt number. If a user device is performing PDCCH detection attempts for a given aggregation level, if a PDCCH detection attempt is unsuccessful and a current number of PDCCH detection attempts the user device has performed for the given aggregation level is less than then corresponding individual PDCCH detection attempt number for the given aggregation level, then the user device will perform another PDCCH detection attempt for the given aggregation level. If not, then the user device will move to the next aggregation level in the detection order.

Additionally, a user device may be configured to perform PDCCH detection attempts in search spaces. A search space includes a set of one or more PDCCH candidates. Additionally, a single CORESET may include multiple search spaces. A CCE is the unit upon which a search space for detection attempts are defined. Also, a user device may be configured to perform PDCCH detection attempts in a plurality of search spaces. Each search space may be associated with a number of PDCCH detection attempts. Accordingly, in a given search space, the user device may perform the number of detection attempts associated with the given search space.

In particular embodiments, each search space is associated with a set of one or more aggregation levels. For such embodiments, the maximum number of PDCCH detection attempts that a user device performs in a given search space is the total PDCCH detection attempt number of the aggregation level set associated with the given search space.

Additionally, in various embodiments, the communication system 100 may utilize different types of search spaces, including device-specific (or UE-specific) search spaces, and common (or UE-group) search spaces. In a device-specific search space, a user device uses its unique C-RNTI to perform one or more PDCCH detection attempts. In a common search space, a user device uses one or more of the other RNTI types to perform one or more PDCCH detection attempts, although a user device may also use a C-RNTI for certain types of common search spaces.

Additionally, a common search space may have an associated common search space type from among a plurality of common search space types. Within a given common search space, the type of RNTI that the user device uses may depend on the common search space type of the given common search space. The common search space types may be defined by the specification used for the communication system 100. As examples, in 5G NR, for a first common search space type (Type 0 CSS) and a second common search space type (Type OA CSS), the user device uses a SI-RNTI; in a third common search space type (Type 1 CSS), the user device uses RA-RNTI and/or TC-RNTI; in a fourth common search space type (Type 2 CSS), the user device uses P-RNTI, and in a fifth common search space type (Type 3 CSS), the user device uses INT-RNTI, SFI-RNTI, TPC-PUSCH-RNTI, TPC-PUCCH-RNTI, TPC-SRS-RNTI. Various other common search space types and/or device identifies (e.g., RNTI) may be used in any other of various common search space configurations.

Additionally, in various embodiments, a wireless access node may generate DCIs with certain DCI formats for monitoring or detection in certain search spaces. Which type of search space in which a given DCI is to be detected may depend on the type of RNTI used to scramble the given DCI. For example, if a DCI having a DCI format 1-1 is to be detected or monitored in a device-specific search space, the wireless access node may scramble the DCI having the DCI format 1-1 with a C-RNTI.

In addition, in various embodiments, a user device may monitor for and/or perform PDCCH detection attempts in or over PDCCH occasions (PO) (also called PDCCH monitoring occasions). In various embodiments, in one PDCCH occasion, a user device may perform PDCCH detection attempts in one or more search spaces, for one or more aggregation level sets, or various combinations thereof. In various embodiments, one PO may occur in one slot, or span multiple slots, or multiple POs may span one slot, depending on the configuration. Also, in various embodiments, the wireless access node may determine the number of search spaces and/or the number of aggregation level sets for a given PDCCH, for a given slot, and/or per PO or per slot.

In addition or alternatively, a wireless access node may determine a maximum number of PDCCH detection attempts (or PDCCH candidates) that a user device performs, and/or a maximum number of non-overlapped CCEs for which a user device monitors, per slot for a downlink (DL) bandwidth part (BWP) for a single serving cell. Non-overlapped CCEs have different CORESET indices and/or have different first symbols for reception of their respective PDCCH candidates. Additionally, the maximum number of PDCCH detection attempts and maxim number of non-overlapped CCEs per slot for DL BWP for a single serving cell may vary as a function of sub-carrier spacing (SCS) configurations. Different SCS configurations may be associated with different sub-carrier spacings. Example sub-carrier spacings for 5G NR include 15 kiloHertz (kHz), 30 kHz, 60 kHz, and/or 120 kHz, although other sub-carrier spacings may be possible.

The amount of power that a user device consumes, and/or the PDCCH detection complexity of a user device, is directly related to the maximum number of PDCCH detection attempts that the user device performs, and/or the number of non-overlapped CCEs that a user device monitors, per slot. In certain configurations or situations, and/or for certain user devices such as reduced capability (RED-CAP) devices, it may be desirable to have the user device operate with lower power consumption and/or with reduced complexity. As such, it may be desirable to have a user device detect PDDCH candidates and/or DCIs with lower maximum number of PDCCH detection attempts per slot and/or monitor for lower numbers of non-overlapped CCEs per slot.

The maximum number of PDCCH detection attempts per slot and/or the number of non-overlapped CCEs per slot may depend on two general factors, including a DCI monitoring number and a total PDCCH detection attempt number per set of aggregation levels. The total PDCCH detection attempt number, in turn, may depend on the number of aggregation levels in a set and individual PDDCH detection attempt numbers for each of the aggregation levels in the set. The present describes various ways to reduce power consumption and/or device complexity by setting any of various combinations of the DCI monitoring numbers, non-overlapped CCE numbers, aggregation level numbers, PDCCH detection attempt numbers.

FIG. 2 is a flow chart of an example method 200 of wireless communication. The method 200 may be used between two communication nodes 102, 104 in the wireless communication system 100, such as between a wireless access node transmitting a plurality of DCIs or PDCCH candidates to a user device. To do so, the wireless access node may set PDCCH detection attempt parameters for the user device. In general, the PDCCH detection attempt parameters include any parameters that that will allow for PDCCH candidate transmission and/or PDCCH candidate detection/decoding as desired by the wireless access node. Accordingly, at block 202, the wireless access node may set or determine a set of PDCCH detection attempt parameters. In various embodiments, the PDCCH detection attempt parameters are determined for a search space, for a set of search spaces, for a slot, for a set of slots, for a PDCCH occasion, for a set of PDCCH occasions, for any of various combinations thereof, as non-limiting examples. Also, in any of various embodiments described herein, any or all of the PDCCH detection attempt parameters may be set or determined via radio resource control (RRC) (layer) configurations or signaling, and/or may be indicated in one or more fields in one or more DCIs. In addition or alternatively, in various embodiments, one of more of the PDCCH detection attempt parameters may be determined according to one or more of various parameters, including: a number of DCI sizes, a number of search spaces, a number of DCI formats, a number of DCI sizes in a slot or on a PDCCH occasion, a number of search spaces in a slot or on a PDCCH occasion, a number of DCI formats in a slot or on a PDCCH occasion, a coverage level, an aggregation level, or a number of PDCCH candidates, as examples. Also, in any of various embodiments described herein, the PDDCH detection attempt parameters include one or more of: a total DCI monitoring number, a specific DCI monitoring number, a number of non-overlapped CCEs, an aggregation level number, or a total PDCCH detection attempt number. Various ways of setting or determining these parameters are described in further detail below.

In various embodiments, one type of PDCCH detection attempt parameter is a total DCI size monitoring number, which is a maximum number of different DCI sizes up to which DCIs can have for the user device to successfully detect them. The total DCI size monitoring number generally pertains to any DCI, irrespective of DCI format and/or which RNTI is used for scrambling. Another type of PDCCH detection attempt parameter is a specific DCI size monitoring number, which is a maximum number of different DCI sizes up to which DCIs generated with C-RNTIs can have for the user device to successfully detect them.

The wireless access node may generate DCIs according to the total DCI size monitoring number and the specific DCI monitoring number that it sets. In order to do so, the wireless access node may determine a target DCI size that each DCI is supposed to have in order to satisfy the total and specific DCI size monitoring numbers. If the wireless access node initially generates a given DCI with an initial DCI size less than the target DCI size, then the wireless access node may increase the DCI size, such as by zero padding, so that the DCI has the target DCI size. Similarly, if the wireless access node initially generates a given DCI with an initial DCI size greater than the target DCI size, then the wireless access node may decrease the DCI size so that the DCI has the target DCI size. In some embodiment, the size reduction may involve truncating DCI, such as by removing a number of most significant bits in a frequency domain resource assignment field of the DCI.

Also, in various embodiments, for a DCI generated according to a number of DCI formats scrambled with C-RNTI, the DCIs may be generated with a field having log $2X$ bits to indicate the DCI format, where X is the number of DCI formats scrambled with C-RNTI. For example, if five DCI formats can be scrambled with C-RNTI, then the DCI should each include a 3-bit field to indicate the DCI format of the DCI.

In various embodiments, the wireless access node may be configured to identify a configured, initial, predefined, default, or predetermined maximum total DCI size monitoring number (also called a configured, initial, predefined, or default total DCI size monitoring number), and/or a predetermined maximum specific DCI size monitoring number (also called a configured, initial, predefined, or default specific DCI size monitoring number). In certain embodiments, the predetermined maximum total DCI size monitoring number is four, and the predetermined maximum specific DCI size monitoring number is three, although other numbers may be possible in any of various configurations. When setting the PDCCH detection attempt parameters, the wireless access node may set the total DCI size monitoring number to no larger than the predetermined maximum total DCI size monitoring number, and/or may set the specific DCI size monitoring number to no larger than the predetermined maximum specific DCI size monitoring number.

In particular embodiments, the wireless access node may set the total DCI size monitoring number to less than the predetermined maximum total DCI size monitoring number, and/or may set the specific DCI size monitoring number to less than the predetermined maximum specific DCI size monitoring number. For example, when setting the total DCI size monitoring number, the wireless access node may select among the predetermined maximum number and one of the lower numbers, and decides to select one of the lower numbers. Similarly, when setting the specific DCI size monitoring number, the wireless access node may select between the predetermined maximum number and one or more lower numbers, and decides to select one of the lower numbers.

For some of these embodiments, the wireless access node may set the total DCI size monitoring number to one. Correspondingly, the specific DCI size monitoring number is also one. For at least some of these embodiments, the DCI size of the DCIs generated may be the DCI size of DCI format 1-0 monitored in one or more common search spaces. Also, in various of these embodiments, DCIs having a DCI 2-x (x can be 0, 1, 2, 3, 4, 5, 6, or other numbers) format monitored in a type 3 common search space may have the same DCI size as DCI format 1-0 monitored in a common search space.

For other of these embodiments, the wireless access node may set the total DCI size monitoring number to a first value greater than one, and the specific DCI size monitoring number a second value that is one less than the first value. For example, the wireless access node may set the total DCI size monitoring number to two, and/or may set the specific DCI size monitoring number to one. For at least some of these embodiments, a first DCI size may be a DCI size of DCI format 1-0 monitored in a common search space. In addition, a second DCI size corresponding to the total DCI size monitoring number may be equal to a third size corresponding to the specific DCI size monitoring number, a largest DCI size among a plurality of DCI sizes for a plurality of DCI formats scrambled with one or more C-RNTIs, a smallest DCI size among a plurality of DCI sizes for a plurality of DCI formats scrambled with one or more C-RNTIs, an average DCI size or a median DCI size among the plurality of DCI sizes for the plurality of DCI formats scrambled with the one or more C-RNTIs, or other predefined or configured DCI size. In addition or alternatively, the third DCI size corresponding to the specific DCI size monitoring number is at least one of: a common DCI size for a first set of DCIs scrambled by one or more C-RNTIs; a common DCI size for a second set of DCIs scrambled by one or more RNTIs other than a C-RNTI; a common DCI size for a third set of DCIs monitored in one or more device-specific search spaces; or a common DCI size for a fourth set of DCIs monitored in the one or more device-specific search spaces and one or more type 3 common search spaces. In addition or alternatively, any of the various DCI sizes may be configured by RRC or may be a predetermined or default value, in any of various embodiments.

For other of these embodiments, the wireless access node may set the total DCI size monitoring number to three and/or may set the specific DCI size monitoring number to two. In various embodiments, the DCI sizes may be predefined or preconfigured sizes. Additionally, for at least some of these embodiments, the wireless access node may use a first DCI size for generating DCIs having a DCI format 1-0 or a DCI format 0-1 monitored in common search spaces; may use a second DCI size for generating DCIs scrambled with C-RNTIs monitored in UE-specific search spaces; and a third DCI size for generating DCIs scrambled with C-RNTIs and/or monitored in type 3 common search spaces.

In addition or alternatively, for at least some of these embodiments, the wireless access node may use a first DCI size for generating DCIs scrambled with C-RNTIs and having a first set of DCI formats, and may use a second DCI size for generating DCIs scrambled with C-RNTIs and having a second set of DCI formats. In various embodiments, the first set of DCI formats and the second DCI formats may have least one DCI format different from each other. In some embodiments, the first set of DCI formats includes at least one of a DCI format 1-1 or a DCI format 0-1 monitored in one or more UE-specific search spaces; and the second set of DCI formats includes at least one of a DCI format 1-2, a DCI format 0-2, a DCI format 1-0, or a DCI format 0-0 monitored one or more UE-specific search spaces. In other embodiments, the first set of DCI formats includes at least one of: a DCI format 1-1, a DCI format 1-2, a DCI format 0-1, or a DCI format 0-2 monitored in one or more UE-specific search spaces; and the second set of one or more DCI formats includes at least one of a DCI format 1-0 or a DCI format 0-0 monitored in one or more UE-specific search spaces. In still other embodiments, the first set of DCI formats includes at least one of a DCI format 1-2 or a DCI format 1-1, and the second set of DCI formats includes at least one of a DCI format 1-0, a DCI format 0-1, a DCI format 0-2, or a DCI format 0-0.

In addition or alternatively, for at least some of these embodiments, the wireless access node may use a first DCI size for generating DCIs having a first set of DCI formats, a second DCI size for generating DCIs having a second set of DCI formats, and a third size for generating DCIs having a third set of DCI formats. For at least some of these embodiments, the first set of DCI formats includes at least one of a DCI format 1-1 or a DCI format 0 0-1 monitored in one or more UE-specific search spaces; the second set of DCI formats includes at least one of a DCI format 1-2 or a DCI format 0-2 monitored in UE-specific search spaces; and the third set of DCI formats includes at least one of a DCI format 1-0 or a DCI format 0-0 monitored in one or more common search spaces.

Additionally, in various embodiments, the wireless access node may set the total DCI size monitoring number and/or the specific DCI size monitoring number according to or via a radio resource control (RRC) layer indication or a DCI indication. For at least some of these embodiments, each DCI size corresponds to a respective one of a plurality of sets of DCI formats. In at least some of these embodiments, the wireless access node may generate the DCIs to have at least one field indicating at least one of the total DCI size monitoring number or the specific DCI size monitoring number. In this context, the DCI indication and/or its field may be dynamic, in that the field may indicate any of various numbers of sizes, such as one, two, three, or four.

Additionally, in various embodiments, the wireless access node may set the total DCI size monitoring number and/or the specific DCI size monitoring number according to a number of search spaces on a PDCCH occasion or on a slot. For example, when wireless access node determines that the number of search spaces is small (below a threshold), the wireless access node may set the total DCI size monitoring number to two and the specific DCI size monitoring number to one. As another example, when the wireless access node determines that the number of search spaces is large (above a threshold), the wireless access node may set the total DCI size monitoring number to four.

Also, in various embodiments, the wireless access node may determine a statistic associated with DCI sizes for a plurality of DCIs. The statistic may be determined before any DCI size adjustment, such as before any zero padding or truncation. Example statistics include: a maximum difference, a variance, or a standard deviation, or a total number of DCI sizes configured by the RRC layer. In various embodiments, the wireless access node may compare the statistic with one or more thresholds, and determine at least one of the total DCI size monitoring number or the specific DCI size monitoring number based on the comparison. As a non-limiting example, if the statistic is below a first threshold, the wireless access node may set the total DCI size monitoring number to one; if the statistic is between the first threshold and a second threshold, the wireless access node may set the total DCI size monitoring number to two; if the statistic is between the second threshold and a third threshold, the wireless access node may set the total DCI size monitoring number to three; and if the statistic is above the third threshold, the wireless access node may set the total DCI size monitoring number to four.

Also, in various embodiments, the wireless access node may determine at least one of the total DCI size monitoring number or the specific DCI size monitoring number based on a number of DCI sizes of a plurality of DCI sizes before DCI size alignment, or one or more DCI formats on each PDCCH occasion or on each target slot. DCI size alignment includes size adjustment, such as truncation or zero padding, in order to adjust a current DCI size to a target DCI size, as previously described. The total and/or specific DCI size monitoring numbers may be determined such if the DCI size monitoring numbers are large (above a threshold) before alignment, they stay large after DCI size alignment, and if the DCI size monitoring numbers are small (below a threshold) before alignment, they stay small after DCI size alignment.

Additionally, in various embodiments, the wireless access node may determine at least one of the total DCI size monitoring number or the specific DCI size monitoring number based on or more specific DCI formats. In various embodiments, the one or more specific DCI formats may be identified or configured by the RRC layer. In addition or alternatively, the one or more specific DCI formats are on each PDCCH occasion. In some of these embodiments, the wireless access node determines the total DCI size monitoring number and/or the specific DCI size monitoring number to be one when the specific DCI formats include at least one of: DCI format 0-0, DCI format 1-0, and/or DCI format 2-x, where x is an integer. In other of these embodiments, the wireless access node determines the total DCI size monitoring number and/or the specific DCI size monitoring number to be two or less when the specific DCI formats include one or more of: DCI format 1-0 or DCI format 1-1.

In addition, in various embodiments, the wireless access node may determine at least one of the total DCI size monitoring number or the specific DCI size monitoring number based on one or more predetermined search space types. In various embodiments, the one or more predetermined search space types may be configured by the RRC layer, and/or may be one or more search space types on each PDCCH occasion. In addition or alternatively, in at least some of these embodiments, the search space type includes at least one of a UE-specific search space or a common search space. For other of these embodiments, the one or more search space types includes at least one of: a type 0 common search space, a type OA common search space, a type 1 common search space, a type 2 common search space, a type 3 common search space, or a UE-specific search space. Also, in various of these embodiments, the wireless access node may determine at least one of the total DCI size monitoring number or the specific DCI size monitoring number further based on a number of search space types. As a non-limiting example, the wireless access node may determine to set the total DCI size monitoring number to two in response to determining that the number of UE-specific search spaces is larger than a threshold (e.g., five).

Reducing the total DCI size monitoring number and/or the specific DCI size monitoring number may reduce the overall PDCCH detection attempt and/or PDCCH candidate numbers and save power, while also may not cause the PDCCH blocking rate to rise. For certain devices, such as REDCAP UEs, fewer antenna numbers and bandwidth may yield fewer DCI fields, in turn narrowing size differences among DCI formats Additionally, fewer functions and relaxed delay requirements, such as for REDCAP UEs, may require fewer DCI formats. Such aspects may allow total and specific DCI size monitoring numbers to be lower than their maximum values.

In addition or alternatively to setting the total DCI size monitoring number and/or the specific DCI size monitoring number, the wireless access node may set or determine a set of aggregation levels according to an aggregation level number that is no larger than a predetermined maximum aggregation level number, and/or a total PDCCH detection attempt number that is no larger than a predetermined maximum total PDCCH detection attempt number. In general, the aggregation level number is a number of different aggregation levels in, or that makes up, a set of aggregation levels. The wireless access node may be configured to identify a predetermined maximum aggregation level number, and can determine the set of aggregation levels to have a number equal to or less than the predetermined maximum aggregation level number. In some example embodiments, the predetermined maximum aggregation level number is five. Also, the wireless access node may also identify a default set of aggregation levels that has or corresponds to the predetermined maximum aggregation level number. For example, a default set of aggregation levels corresponding to the predetermined maximum aggregation level number of five is: {AL1, AL2, AL4, AL8, AL16}.

Additionally, a total PDCCH detection attempt number may be a number for any of various units, such as for a set of aggregation levels, for a single search space, for a set of multiple search spaces, for one slot, for multiple slots, for one PDCCH occasion, or for multiple PDCCH occasions, as non-limiting examples.

For example, a set of aggregation levels that the wireless access node determines may have an associated total PDCCH detection attempt number. The wireless access node may be configured to set that total PDCCH detection attempt number for the set. In various embodiments, each aggregation level in a set has an associated individual PDCCH detection attempt number. In turn, the total PDCCH detection attempt number is the sum of the individual PDCCH detection attempt numbers for the aggregation levels in the set. Accordingly, the wireless access node may be configured to set the total PDCCH detection attempt number by setting the individual PDDCH detection attempt numbers for the aggregation levels in the set. In any of various embodiments, the total PDCCH detection number for a set of aggregation levels may in turn be used for determining a total PDCCH detection number for a search space, a set of search spaces, a slot, a set of slots, a PDCCH occasion, or a set of PDCCH occasions.

Additionally, each aggregation level in the default set may have an associated default, initial, configured or maximum individual PDCCH detection attempt number. In various embodiments, the wireless access node may to set the individual PDCCH detection attempt numbers relative to the corresponding default individual PDCCH detection attempt numbers. For example, suppose the default aggregation level set is {AL1, AL2, AL4, AL8, AL16}, and that corresponding PDCCH detection attempt numbers for the default set is {AL1=X1, AL2=X2, AL4=X3, AL8=X4, AL16=X5}. This means that the user device is to perform a maximum of X1 PDCCH detection attempts when detecting for the first aggregation level AL1, is to perform a maximum of X2 PDCCH detection attempts when detecting for the second aggregation level AL2, and so on. If the wireless access node selects a given default aggregation level to be an aggregation level in the aggregation level set that it uses, then the wireless access node can either set the corresponding individual PDDCH detection attempt number to the default PDCCH detection attempt number associated with the selected given default aggregation level, or use a different, such as a lower, PDCCH detection attempt number. To illustrate, if the wireless access node selects AL1 from the default set to be part of the aggregation level set, then the wireless access can set the individual PDCCH detection attempt number to be X1 or a different number, such as a number lower than X1.

In various embodiments, the wireless access node may set at least one of the total DCI monitoring number, the set of aggregation levels, or the total PDCCH detection attempt number through joint coding in the form of a plurality of states. Each state may indicate at least one of: a total DCI monitoring number, a set of aggregation levels, or a total PDCCH detection attempt number. When the wireless access node selects a state, it uses the information associated with the state when setting one or more PDCCH detection attempt parameters. If a selected state does not have a certain PDCCH detection attempt parameters, the wireless access node may use a default value.

Example states may include the following. A first state may identify a total DCI size monitoring number of two. A second state may identify a total DCI size monitoring number of one. A third state may identify a total DCI size monitoring number of one, and at least one of an aggregation level number lower than the predetermined maximum aggregation level number, or a particular aggregation level set having an aggregation level number lower than the predetermined maximum aggregation level number. For example, if the predetermined maximum aggregation level number is five, then third state may identify an aggregation level number of four or less or may identify a particular set of aggregation levels having an associated aggregation level number of four or less. In some examples, the particular set does not include the aggregation level having the largest size of the default set. For example, if the default set is {AL1, AL2, AL4, AL8, AL16}, the aggregation level with the largest size is AL16. Accordingly, the third state may identify an aggregation level set: {AL1, AL2, AL4, or AL8}. In other examples, the particular set does not include the aggregation levels of the default set having the smallest and largest sizes. For example, a fourth set may identify a total DCI size monitoring number of one, and a particular set of {AL2, AL4, AL8}.

A fifth states may identify one or more individual PDCCH detection attempt numbers to be lower than their corresponding default PDCCH detection attempt numbers. The lower numbers may be lower by a predetermined fraction or percentage, such as one-half as a non-limiting example. In various embodiments, the wireless access node may utilize a rounding-up or a rounding-down scheme if an individual PDCCH detection attempt number is a non-integer after lowering a default number by the fraction or percentage. In various embodiments, example fifth states may also identify a total DCI size monitoring number of one, and/or identify an aggregation level set that does not include the default aggregation level with the largest size and/or the default aggregation level with the smallest size. An example sixth state may be similar to the fifth state, except that instead of lowering the corresponding PDCCH detection attempt numbers by a fraction, the wireless access node may set the PDCCH detection attempt numbers each to include a predetermined value, such as one.

In various embodiments, a seventh state sets the individual PDCCH detection attempt numbers for one or more of the aggregation levels in the set to be or include zero. In addition or alternatively, in various embodiments, an eighth set identifies the total DCI size monitoring number to be the predetermined maximum total DCI size monitoring number, the set of aggregation levels to be the default set, and the individual PDCCH detection attempt numbers to be the default individual PDCCH detection attempt numbers.

Also, in various embodiments, the states may be configured, selected, set, or determined by RRC layer indication or signaling, and/or by a DCI indication in one or more fields of one or more DCIs.

Additionally, in various embodiments, the wireless access node determines the total PDCCH detection attempt number based on at least one of the total DCI size monitoring number, a number of search spaces, a number of DCI sizes, a number of search spaces, a number of DCI formats, a search space type, a coverage level, an aggregation level, or a number of PDCCH candidates. In various embodiments, the wireless access node identifies whether the total DCI size monitoring number corresponds to a predetermined largest DCI size monitoring number or a predetermined smallest DCI size monitoring number from among a plurality of DCI size monitoring numbers. In addition or alternatively, the wireless access node may identify or select a search space number from a plurality of search space numbers, and identify a largest search space number and/or a smallest search space number from among the plurality of search space numbers. In various embodiments, the wireless access node may select a largest total PDCCH detection attempt number from among a plurality of total PDCCH detection attempt numbers in response to the determined search space number being the largest search space number or the total DCI size monitoring number being the largest DCI size monitoring number. Also, in various embodiments, the wireless access node may select a smallest total PDCCH detection attempt number from among the plurality of total PDCCH detection attempt numbers in response to the determined search space number being the smallest search space number or the total DCI size monitoring number being the smallest DCI size monitoring number.

Additionally, in various embodiments, the wireless access node may determine a detection order for the set of aggregation levels. As previously described, the detection order identifies the order of aggregation levels according to which a user device performs PDDCH detection attempts. When performing PDCCH detection attempts, if the user device reaches the total PDCCH detection attempt number, the user device will drop or stop detecting PDCCH candidates according to the detection order.

Additionally, in various embodiments, the set of PDCCH detection attempt parameters may include a number of non-overlapped CCEs for the user device to monitor. For at least some of these embodiments, the wireless access node may select the number of non-overlapped CCEs from a plurality of CCE numbers. In particular embodiments, the wireless access node may make the selection based on a number of control resource sets (CORESET) per bandwidth part (BWP). As examples, where the number of CORESETs is one, the wireless access node may select a first non-overlapped CCE number; where the number of CORESETs is two, the wireless access node may select a second non-overlapped CCE number; and where the number of CORESETs is three, the wireless access node may select a third non-overlapped CCE number.

Also, in various embodiments, the wireless access node may identify an initial, default, configured, or predetermined maximum PDCCH detection attempt number. In any of various embodiments, the predetermined maximum PDCCH detection attempt number may be for a search space, multiple search spaces, a slot, multiple slots, a PDCCH occasion, or multiple PDCCH occasions. When setting the PDCCH detection attempt parameters, the wireless access node may set the total PDCCH detection attempt number to no larger than the predetermined maximum total PDCCH detection attempt number. In various embodiments, the wireless access node may set the total PDCCH detection attempt number by applying a reduction coefficient to the total PDCCH detection attempt number. In general, a reduction coefficient is a number between, and including, 0 and 1. In various embodiments, the wireless access node may apply the reduction coefficient to the predetermined maximum total PDDCH detection attempt number by performing a mathematical operation on the predetermined maximum total PDCCH detection attempt number using a reduction coefficient. For example, the wireless access node may multiple the reduction coefficient to the total PDCCH detection attempt number.

Also, in various embodiments, the wireless access node may determine the reduction coefficient by selecting the reduction coefficient from a set of reduction coefficient. A non-limiting example of a set of reduction coefficients may include: $\{0, 1/8, 1/4, 3/8, 1/2, 5/8, 3/4, 7/8, 1\}$. In various embodiments, which coefficient the wireless access node selects may depend on one or more parameters, examples of which include: a number of DCI sizes, a number of search spaces, a number of DCI formats, a DCI indication, a RRC layer configuration, a coverage level, or a number of PDCCH candidates for a given aggregation level.

In addition, in various embodiments, as previously described, the total PDDCH detection attempt number may be based on a sum of individual PDCCH detection attempt numbers for each aggregation level in a set of aggregation levels. Similarly, the predetermined maximum total PDCCH detection attempt number may be based on a sum of predetermined maximum individual PDCCH detection attempt numbers for each aggregation level. In various embodiments, the wireless access node may apply the reduction coefficient to each of the predetermined maximum individual PDCCH detection attempt numbers to determine the individual PDCCH detection attempt numbers, and in turn the total PDCCH detection attempt number. To illustrate, for a given aggregation level set of $\{AL1, AL2, AL4, AL8, AL16\}$, suppose the corresponding set of predetermined maximum PDCCH detection attempt numbers X is: [X1 X2 X3 X4 X5], where X1 is the predetermined maximum individual PDCCH detection attempt number for AL1, and so on. In various embodiments, the wireless access node may apply a reduction coefficient C to each of [X1 X2 X3 X4 X5] to generate a set of individual PDCCH detection attempt numbers Y=[Y1 Y2 Y3 Y4 Y5] for the set of aggregation levels. For example, Y1=C*X1, Y2=C*X2, Y3=C*X3, Y4=C*X4, Y5=C*X5. As another example, Y1= (1−C)*X1, Y2=(1−C)*X2, Y3=(1−C)*X3, Y4=(1−C)*X4, Y5=(1−C)*X5. In other embodiments, the wireless access node may apply a reduction coefficient C to less than all of the predetermined maximum individual PDCCH detection attempt numbers. For example, the wireless access node may apply the reduction coefficient C to only X1 and X2, or to only X4, as non-limiting examples.

In other example embodiments, the total PDCCH detection attempt number may be for a slot, and the wireless access node applies the reduction coefficient to the total PDCCH detection attempt number for the slot.

Additionally, in various embodiments, the reduction coefficient C includes a set of reduction coefficients, rather than a single value. The number of reduction coefficients in the set may be equal to the number of aggregation levels in the set of aggregation levels. For example, the wireless access node may identify a set of five reduction coefficients [C1 C2 C3 C4 C5] for an aggregation level set having five aggregation levels, for example $\{AL1, AL2, AL4, AL8, AL16\}$. Each reduction coefficient corresponds to a respective one of the aggregation levels, and in turn, a respective predetermined maximum PDCCH detection attempt number [X1 X2 X3 X4 X5]. Additionally, each of the reduction coefficients may be the same or different from each other. The wireless access node may determine a set of individual PDCCH detection attempt numbers Y by applying each of the reduction coefficients C to a corresponding predetermined maximum individual PDCCH detection attempt number X. For example, Y1=C1*X1, Y2=C2*X2, Y3=C3*X3, Y4=C4*X4, Y5=C5*X5. As another example, Y1=(1-C1)*X1, Y2=(1-C2)*X2, Y3=(1-C3)*X3, Y4=(1-C4)*X4, Y5=(1-05)*X5.

Additionally, in various embodiments, the set of reduction coefficients may all have the same values. In other embodiments, the set of reduction coefficients all have different values. In still other embodiments, the set of reduction coefficients have values that correspond to the aggregation level sizes in any of various ways. In some of these embodiments, the set of coefficients may have increasing values corresponding to an ascending order in size of the aggregation levels. In these embodiments, each reduction coefficient for a given aggregation level has a value that is greater than or equal to all other reduction coefficients of the set associated with aggregation levels smaller than the given aggregation level. In other of these embodiments, the set of coefficients may have increasing values corresponding to a descending order in size of the aggregation levels. In these embodiments, each reduction coefficient for a given aggregation level has a value that is greater than or equal to all other reduction coefficients of the set associated with aggregation levels larger than the given aggregation level. In other embodiments, there is no correspondence between aggregation level sizes and reduction coefficient values.

Also, in various embodiments, the wireless access node may select from a plurality of sets of reduction coefficients. For at least some of these embodiments, the wireless access node may make the selection according to one or more predetermined parameters, including but not limited to: may depend on one or more parameters, examples of which include: a number of DCI sizes, a number of search spaces, a number of DCI formats, a DCI indication, a RRC layer configuration, a coverage level, or a number of PDCCH candidates for a given aggregation level. For a given parameter, if the given parameter has first value, the wireless access node may choose a first set of reduction coefficients corresponding to the first value, and if the given parameter has a second value, the wireless access node may choose a second set of reduction coefficients corresponding to the second value. To illustrate, in various embodiments, the wireless access node may be configured to identify a coverage level from among a plurality of coverage levels. For example, a first coverage level may indicate a "good" coverage level, which in turn may indicate a "good" connection quality, and a second coverage level may indicate a "poor" coverage level, which in turn may indicate a "poor" connection quality. If the wireless access node identifies the first coverage level, then the wireless access node may select a first set of reduction coefficients corresponding to the first coverage level. Alternatively, if the wireless access node identifies the second coverage level, then the wireless access node may select a second set of reduction coefficients corresponding to the second coverage level.

Two Tables below illustrate example sets of reduction coefficients that a wireless access node may select from for a set of aggregation levels. Each table includes three sets of reduction coefficients from which the wireless access node may select. In Table 1, each of the reduction coefficient sets have increasing values corresponding to increasing or ascending aggregation level sizes. In Table 2, each of the reduction coefficients have increasing values corresponding to decreasing or descending aggregation level sizes.

TABLE 1

| AL | Coefficient set1 | Coefficient set2 | Coefficient set3 |
|---|---|---|---|
| 1 | 1/4 or 0 | 1/4 or 0 | 1/4 or 0 |
| 2 | 1/4 | 1/4 | 1/4 |
| 4 | 1/4 | 2/4 | 1/4 |
| 8 | 2/4 | 3/4 | 1/4 |
| 16 | 3/4 | 1 | 2/4 |

TABLE 2

| AL | Coefficient set1 | Coefficient set2 | Coefficient set3 |
|---|---|---|---|
| 16 | 1/4 or 0 | 1/4 or 0 | 1/4 or 0 |
| 8 | 1/4 | 1/4 | 1/4 |
| 4 | 1/4 | 2/4 | 1/4 |
| 2 | 2/4 | 3/4 | 1/4 |
| 1 | 3/4 | 1 | 2/4 |

As illustrated in the tables, in various embodiments, the set of reduction coefficients may have a baseline or initial reduction coefficient having the smallest value. All of the other reduction coefficients in the set may have an associated value that is greater than or equal to the smallest value of the baseline reduction coefficient.

In various embodiments, any reduction coefficient, including a baseline coefficient and a baseline reduction coefficient, can be configured by the RRC layer, and/or indicated by a DCI indication Also, in various embodiments, the wireless access node may determine a reduction coefficient or a set of reduction coefficients on any of various types of interval bases, including per bandwidth part, per search space, per PDCCH occasion, or per slot, as non-limiting examples.

In other embodiments, the wireless access node may determine individual PDCCH detection attempt numbers without using, or independent of, reduction coefficients. For example, the wireless access node may determine an individual PDCCH detection attempt number for a given aggregation level that is less than associated predetermined maximum value, without applying a reduction coefficient to the predetermined maximum value. For example, the wireless access node may identify the individual PDCCH detection attempt number in a lookup table. In various embodiments, the individual PDCCH detection attempt number may be lower than the associated predetermined maximum value. In various embodiments, the parameters previously identified, may also or alternatively be used for selecting an individual PDCCH detection attempt value. For example, for a given aggregation level, if the wireless access node identifies a first coverage level, the wireless access node may select a first value $P1$ for the individual PDCCH detection attempt value corresponding to the given aggregation level; and if the wireless access node identifies a second coverage level, the wireless access node may select a second value $P2$ for the individual PDCCH detection attempt value corresponding to the given aggregation level.

Additionally, in various embodiments, the wireless access node may select a set of individual PDCCH detection attempt numbers from among a plurality of sets of individual PDCCH detection attempt numbers according to a sub-carrier spacing (SCS) configuration. For example, different SCS configurations corresponding to different sub-carrier spacing may correspond to different sets of individual PDCCH detection attempt numbers. Upon identifying a SCS configuration from among a plurality of SCS configurations, the wireless access node may select the of individual PDCCH detection attempt numbers from the set corresponding to the identified SCS configuration.

Also, in various embodiments, the wireless access node may identify a reduction order for a set of aggregation levels. In general, a reduction order identifies an order in which individual PDCCH detection attempt numbers for aggregation levels in a set are to be reduced from respective predetermined maximum numbers. For at least some of these embodiments, the wireless access node may determine to reduce one or more individual PDCCH detection attempt numbers if the corresponding total PDCCH detection attempt number is above a target value. If it is, then the wireless access node may determine to reduce one or more individual PDCCH detection attempt numbers according to the reduction order in order move the total PDCCH detection attempt number to the target value. When the wireless access node reduces according to the reduction order, the wireless access node reduces the individual PDCCH detection attempt number corresponding to a first aggregation level in the reduction order. When the wireless access node is finished reducing the individual PDCCH detection attempt number corresponding to the first aggregation level in the reduction order, then the wireless access node reduces the individual aggregation level number corresponding to the next aggregation level in the reduction order. The wireless access node iterates through the aggregation levels in the reduction order until the total PDCCH detection attempt number reaches the target value.

The wireless access node may determine the reduction order for a given set of aggregation levels in any of variety of different ways. In some example embodiments, the reduction order identifies the aggregation levels in increasing size, meaning that the wireless access node reduces the individual PDCCH detection attempt number for the smallest aggregation level first, and each next aggregation level in the reduction order has a larger size than the previous aggregation level. In other example embodiments, the reduction order identifies the aggregation levels in decreasing size, meaning that the wireless access node reduces the individual PDCCH detection attempt number for the largest aggregation level first, and each next aggregation level in the reduction order has a smaller size than the previous aggregation level. Various other types of reduction orders are possible.

Also, for embodiments where the wireless access node reduces one or more individual PDCCH detection attempt numbers according to a reduction order, in some of these embodiments, the wireless access node may reduce individual PDCCH detection attempt numbers for all of a determined set of search spaces. For other embodiments, the wireless access node may reduce individual PDCCH detection attempt numbers according to a reduction order for only some search spaces. For example, the wireless access node may reduce individual PDCCH detection attempt numbers for only the last search space of a set of search spaces.

In various embodiments, a last search space may be identified according to following. A PDCCH candidate for an aggregation level with an index $m_{S_j n_{CI}}$ for a search space set $S_j$ using a set of CCEs in a CORESET p on an active downlink (DL) bandwidth part (BWP) for serving cell $n_{CI}$ is not counted for monitoring if there is a PDCCH candidate with index $m_{S_i n_{CI}}$ for a search space set $S_i \le S_j$, or if there is a PDCCH candidate with index $n_{S_j n_{CI} \ and \ n_{S_j n_{CI}}} < m_{S_j n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $m_{S_j n_{CI}}$ is counted for monitoring.

At block 204, after determining setting the PDCCH detection attempt parameters at block 202, the wireless access node may transmit to the user device at least one of: the PDCCH detection attempt parameters, one or more DCIs generated according to the PDCCH detection attempt parameters, or at least one PDCCH generated according to the PDCCH detection attempt parameters. In various embodiments, the method may also include the user device performing PDCCH detection attempts and/or detecting the one or more DCIs and/or the at least one PDCCH according to the PDCCH detection attempt parameters determined at block 202.

FIG. 3 is a flow chart of another example method 300 for wireless communication. At block 302, the user device may determine a set of PDCCH detection attempt parameters. The user device may determine the set of PDCCH detection attempt parameters in any of various ways or combinations of ways. For example, the user device may receive some or all of the PDCCH detection attempt parameters from the wireless access node, such as via RRC signaling and/or through DCI indications. As another example, the user device may determine some or all of the PDCCH detection attempt parameters based on other information. For such embodiments, the user device may have or all of the functionality that the wireless access node has for determining one or more PDCCH detection attempt parameters. For example, the wireless access node may provide some information to the user device, and in turn, the user device derives one or more of the PDCCH detection attempt parameters. The PDCCH detection attempt parameters may be set or determined according to any of the various embodiments described with reference to block 202 of FIG. 2. At block 304, the user device may detect the one or more DCIs and/or the at least one PDDCH according to the PDCCH detection attempt parameters.

Additionally, in any of various embodiments, after the user device receives one or more DCIs, and/or determines the PDCCH detection attempt parameters, the user device may use an application delay or a starting slot. In particular, after the application delay or the starting slot is used, the user device may detect or decode the PDCCH according to a PDCCH detection attempt parameters. In various embodiments, user device may determine the start position or application delay according to one of the following mathematical equations or algorithms:

$$X = \left\lfloor n \frac{2^{uPDSCH}}{2^{uPDCCH}} \right\rfloor + X_0,$$

$$\text{or } X = \left\lfloor n \frac{2^{uPDSCH}}{2^{uPDCCH}} \right\rfloor + X_0 + Z_u,$$

where n is the slot with a scheduling DCI or is a configured/default value or determined by a slot offset K0 or K2, or is set to 1; $X_0$ is based on a numerology of PDSCH, $\mu PDSCH$ is a sub-carrier spacing configuration for PDSCH, $\mu PDCCH$ is a sub-carrier spacing configuration for PDCCH, $Z_u$ is a fixed or configured value according to different sub-carrier spacing configurations. Zu may correspond to the ratio of $X_0/Zu$, which may be predefined or configured by higher layers (e.g., RRC), such as in accordance with the following table:

| SCS | $X0/Z_u$ |
|---|---|
| u = 0 | M |
| u = 1 | N |
| u = 2 | P |
| u = 3 | Q |

In addition or alternatively, the application delay can be a fixed value based on a temporal unit (e.g., millseconds) or based on slot. In addition or alternatively, in various embodiments, the application delay may be configured in SPS-DL (SPS-Config)/CG-UL (ConfiguredGrantConfig), or configured per bandwidth part (BWP). Per BWP Configuration may refer to each configuration being value in corresponding BWP. Also, BWP switching may allow the BWP configuration to change. Also, in various embodiments, the application delay or the starting slot may be based on DTX duration.

Various additional embodiments include any of various combinations of the following:

1. A method for wireless communication, the method comprising:

setting, by a wireless access node, physical downlink control channel (PDCCH) detection attempt parameters for a user device by at least one of:

setting a total downlink control information (DCI) monitoring number no larger than a predetermined maximum total DCI monitoring number;

setting a specific DCI monitoring number no larger than a predetermined maximum specific DCI monitoring number;

setting a number of non-overlapped channel control elements (CCEs) for the user device to monitor no larger than a predetermined maximum number of CCEs for the user device to monitor;

setting an aggregation level number for a set of aggregation levels no larger than a configured aggregation level number;

setting a total PDCCH detection attempt number no larger than a predetermined maximum total PDCCH detection attempt number; or transmitting, by the wireless access node to the user device, at least one of:

the PDCCH detection attempt parameters;

one or more DCIs, according to the PDCCH detection attempt parameters; or at least one PDCCH according to the PDCCH detection attempt parameters.

2. The method of claim 1, wherein the one or more DCIs are generated with a single DCI size comprising a DCI size of a DCI format 1-0 monitored in common search space.

3. The method of claim 1, wherein a first DCI size is a DCI size of a DCI format 1-0 monitored in a common search space.

4. The method of claim 1, wherein at least one of a second DCI size or a third DCI size is one of: configured by a radio resource control (RRC), a default size, or indicated by DCI.

5. The method of claim 1, wherein setting the PDCCH detection attempt parameters is for a slot, a set of slots, a PDCCH occasion, or a period of time.

6. The method of claim 1, wherein at least one of: setting the total DCI size monitoring number or setting the specific DCI size monitoring number is via a radio resource control (RRC) indication or a DCI indication.

7. The method of claim 1, wherein one or more predetermined DCI formats are defined by a radio resource control (RRC) of the wireless access node, or are one or more predetermined DCI formats on each PDCCH occasion or slot.

8. The method of claim 1, wherein the one or more predetermined search space types comprises:

a common search space and a user equipment (UE)-specific search space; or a Type 0 common search space, a type OA common search space, a type 1 common search space, a type 2 common search space, a type 3 common search space, and a UE-specific search space.

9. The method of claim 1, wherein a state is selected according to a DCI indication or a radio resource control (RRC) configuration.

10. The method of claim 1, wherein a number of PDCCH detection attempts for each aggregation level in the set includes zero.

11. The method of claim 1, wherein all reduction coefficients in a set are the same.

12. The method of claim 1, wherein at least two of the reduction coefficients in a set are different from each other.

13. The method of claim 1, wherein all reduction coefficients C are the same for all earch spaces in a slot.

14. The method of claim 1, wherein at least two of the reduction coefficients are different from each other for all search spaces in the slot.

Various additional embodiments include any of various combinations of the following:

1. A method for wireless communication, the method comprising:

determining, by a user device, physical downlink control channel (PDCCH) detection attempt parameters including at least one of:

determining a total downlink control information (DCI) monitoring number no larger than a predetermined maximum total DCI monitoring number;

determining a specific DCI monitoring number no larger than a predetermined maximum specific DCI monitoring number;

determining a number of non-overlapped channel control elements (CCEs) for the user device to monitor no larger than a predetermined maximum number of CCEs for the user device to monitor;

determining an aggregation level number for a set of aggregation levels no larger than a configured aggregation level number;

determining a total PDCCH detection attempt number no larger than a predetermined maximum total PDCCH detection attempt number; or detecting, by the wireless access node to the user device, at least one of:

one or more DCIs, according to the PDCCH detection attempt parameters; or at least one PDCCH according to the PDCCH detection attempt parameters.

2. The method of claim 1, wherein determining the set of PDCCH detection attempt parameters comprises: determining the total DCI size monitoring number to be one.

3. The method of claim 2, wherein the one or more DCIs generated with a single DCI size comprising a DCI size of a DCI format 1-0 monitored in common search space.

4. The method of claim 1, wherein determining the PDCCH detection attempt parameters comprises at least one of: determining the total DCI size monitoring number to be two corresponding to a first DCI size and a second DCI size, or determining the specific DCI size monitoring number to be one corresponding to a third DCI size.

5. The method of claim 4, wherein the first DCI size is a DCI size of a DCI format 1-0 monitored in a common search space.

6. The method of claim 4, wherein the second DCI size is at least one of:

the same as the third DCI size;

a largest DCI size among a plurality of DCI sizes for a plurality of DCI formats scrambled with one or more cell radio-network temporary identifiers (C-RNTIs);

a smallest DCI size among the plurality of DCI sizes for the plurality of DCI formats scrambled with the one or more C-RNTIs; or an average DCI size or a median DCI size among the plurality of DCI sizes for the plurality of DCI formats scrambled with the one or more C-RNTIs.

7. The method of claim 4, wherein the third DCI size is at least one of:

a common DCI size for a first set of DCIs scrambled by one or more cell radio-network temporary identifiers (C-RNTI);

a common DCI size for a second set of DCIs scrambled by one or more RNTIs other than a C-RNTI;

a common DCI size for a third set of DCIs monitored in one or more user equipment (UE)-specific search spaces; or a common DCI size for a fourth set of DCIs monitored in the one or more UE-specific search spaces and one or more type 3 common search spaces.

8. The method of claim 4, wherein at least one of the second DCI size or the third DCI size is one of: configured by a radio resource control (RRC), a default size, or indicated by DCI.

9. The method of claim 1, wherein determining the PDCCH detection attempt parameters comprises at least one of: determining the total DCI size monitoring number to be three or determining the specific DCI size monitoring number to be two.

10. The method of claim 9, wherein the total DCI size monitoring number set to three corresponds to:

a first DCI size for a first set of DCI formats having a DCI format 1-0 or a DCI format 0-1 monitored in common search spaces a second DCI size for a second set of DCI formats scrambled with cell radio-network temporary identifiers (C-RNTIs) or monitored in UE-specific search spaces; and a third DCI size for remaining DCI formats other than the first set of DCI formats and the second set of DCI formats.

11. The method of claim 9, wherein setting the specific DCI size monitoring number to two corresponds to:

a first DCI size for a first set of DCIs scrambled with cell radio-network temporary identifiers (C-RNTIs) and having a first set of one or more DCI formats including a DCI format 1-1 and a DCI format 0-1; and a second DCI size for a second set of DCIs scrambled with C-RNTIs and having a second set of one or more DCI formats including other DCI formats scrambled with C-RNTIs except the DCI format 1-1 and the DCI format 0-1.

12. The method of claim 1, wherein determining the PDCCH detection attempt parameters is according to one or more of: a number of DCI sizes; a number of search spaces; a number of DCI formats; a type of search space; a coverage level; an aggregation level; or a number of PDCCH candidates.

13. The method of claim 1, wherein determining the PDCCH detection attempt parameters is for a slot, a set of slots, a PDCCH occasion, or a period of time.

14. The method of claim 1, wherein at least one of: determining the total DCI size monitoring number or determining the specific DCI size monitoring number is via a radio resource control (RRC) indication or a DCI indication.

15. The method of claim 1, further comprising, determining a set of DCI formats for each DCI size corresponding to at least one of the total DCI size monitoring number or the specific DCI size monitoring number.

16. The method of claim 1, wherein at least one of: determining the total DCI size monitoring number to no larger than the predetermined maximum total DCI monitoring number, or determining the specific DCI size monitoring number to no larger than the predetermined maximum specific DCI monitoring number, is according to a number of search spaces.

17. The method of claim 1, further comprising:

determining, by the user device, at least one of the total DCI size monitoring number or the specific DCI size monitoring number based on a statistic.

18. The method of claim 17, wherein the statistic comprises: a maximum difference, a variance, a standard deviation, or a total number of the DCI sizes 19. The method of claim 1, further comprising:

determining, at least one of the total DCI size monitoring number or the specific DCI size monitoring number based on:

a number of DCI sizes of the one or more DCIs before a DCI size alignment of the DCI sizes; or one or more DCI formats of the one or more DCIs on each PDCCH occasion or on each target slot.

20. The method of claim 1, further comprising:

determining at least one of the total DCI size monitoring number or the specific DCI size monitoring number, based on one or more predetermined DCI formats.

21. The method of claim 20, wherein the one or more predetermined DCI formats are defined by a radio resource control (RRC), or are one or more predetermined DCI formats on each PDCCH occasion or slot.

22. The method of claim 1, further comprising:

determining, by the user device, at least one of the total DCI size monitoring number or the specific DCI size monitoring number, based on one or more predetermined search space types.

23. The method of claim 22, wherein the one or more predetermined search space types comprises:

a common search space and a user equipment (UE)-specific search space; or a Type 0 common search space, a type OA common search space, a type 1 common search space, a type 2 common search space, a type 3 common search space, and a UE-specific search space.

24. The method of claim 1, further comprising:

determining, by the user device, at least one of the total DCI size monitoring number or the specific DCI size monitoring number, based on one or more predetermined search space types and a number of the one or more predetermined search space types.

25. The method of claim 1, wherein the total PDCCH detection attempt number is for one search space, a set of search spaces, or all search spaces in a slot.

26. The method of claim 1, wherein the total PDCCH detection attempt number is a sum of individual PDDCH detection attempt numbers for an aggregation level, a set of aggregation levels, or all aggregation levels in a slot.

27. The method of claim 1, wherein determining at least one of the total DCI size monitoring number, determining the aggregation level number, or determining the total PDCCH detection attempt number comprises:

selecting a state, from among a plurality of different states, wherein each state comprises at least one of:

the total DCI size monitoring number;

the aggregation level number; or a PDCCH detection attempt number for each aggregation level of the set of aggregation levels.

28. The method of claim 27, wherein the state is selected according to a DCI indication or a radio resource control (RRC) configuration.

29. The method of claim 27, wherein the number of PDCCH detection attempts for each aggregation level in the set includes zero.

30. The method of claim 1, wherein determining the set of PDCCH detection attempt parameters comprises: determining, by the user device, the total PDCCH detection attempt number based on at least one of the total DCI size monitoring number or a number of search spaces.

31. The method of claim 1, wherein determining the total PDCCH detection attempt number comprises:

determining, by the user device, a largest total PDCCH detection attempt number from among a plurality of total PDCCH detection attempt numbers in response to the number of search spaces comprising a largest number of search spaces from among a plurality of numbers of search or the total DCI size monitoring number comprising a largest DCI size number; or determining, by the user device, a smallest total PDCCH detection attempt number from among the plurality of total PDCCH detection attempt numbers in response to the number of search spaces comprising a smallest number of search spaces from among the plurality of numbers of search spaces or the total DCI size monitoring number comprising a smallest DCI size number.

32. The method of claim 1, wherein determining the PDCCH detection attempt parameters further comprises:

determining, by the user device, a detection order for the set of aggregation levels, the detection order indicating an order of the aggregation levels for detecting at least one DCI or the at least one PDCCH.

33. The method of claim 32, wherein the detection order is designated for only a last search space of a set of search spaces, or for all search spaces of the set of search spaces.

34. The method of claim 1, wherein determining the total PDCCH detection attempt number further comprises:

determining a plurality of individual PDCCH detection attempt numbers, each for a respective one of the aggregation levels in the set.

35. The method of claim 34, wherein determining the plurality of individual PDCCH detection attempt numbers comprises:

determining the plurality of individual PDCCH detection attempt numbers for a last search space, a set of search spaces, or all search spaces in a slot.

36. The method of claim 34, wherein the set of aggregation levels is for the last search space, the set of search spaces, or all of the search spaces in the slot, the method further comprising:

determining, by the user device, a reduction coefficient C, wherein determining the plurality of individual PDCCH detection attempt numbers is according to C*Y, where Y comprises a plurality of initial PDCCH detection attempt numbers for each aggregation level configured by the search space or the predetermined maximum total PDCCH detection attempt number.

37. The method of 36, further comprising:

determining, by the user device, the reduction coefficient C from a plurality of reduction coefficients according to at least one of: a number of DCI sizes; a number of search spaces, a number of DCI formats, a DCI indication, a radio resource control (RRC) configuration, a coverage level, an aggregation level, or a number of PDCCH candidates for an aggregation level.

38. The method of claim 37, wherein determining the reduction coefficient comprises:

determining, by the wireless access node, a first reduction coefficient corresponding to a first coverage level; and determining, by the wireless access node, a second reduction coefficient corresponding to a second coverage level.

39. The method of claim 36, wherein the reduction coefficient C comprises a set of reduction coefficients, each reduction coefficient in the set of reduction coefficients corresponds to a respective one of the aggregation levels.

40. The method of claim 39, wherein all of the reduction coefficients in the set are the same.

41. The method of claim 39, wherein at least two of the reduction coefficients in the set are different from each other.

42. The method of claim 39, wherein the set of aggregation levels has an ascending order in size, and wherein the set of reduction coefficients increases in value corresponding to the ascending order.

43. The method of claim 39, wherein the set of aggregation levels has a descending order in size, and wherein the set of reduction coefficients increases in value corresponding to the descending order.

44. The method of claim 34, wherein determining the plurality of individual PDCCH detection attempt numbers comprises:

determining a plurality of individual PDCCH detection attempt numbers, each for one of a plurality of aggregation levels for all search spaces in a slot.

45. The method of claim 44, wherein determining the plurality of individual PDCCH detection attempt numbers comprises determining, by the wireless access node, reduction coefficients C for all of the search spaces in the slot.

46. The method of claim 45, wherein all of the reduction coefficients C are the same for all of the search spaces in the slot.

47. The method of claim 45, wherein at least two of the reduction coefficients are different from each other for all of the search spaces in the slot.

48. The method of claim 1, further comprising at least one of:

identifying a sub-carrier spacing (SCS) configuration from among a plurality of SCS configurations;

selecting a set of individual PDDCH detection attempt numbers from among a plurality of sets of individual PDDCH detection attempt numbers depending on the identified SCS configuration; or setting the total PDCCH detection attempt number according to the selected set of individual PDDCH detection attempt numbers.

49. The method of claim 1, wherein determining the PDDCH detection attempt parameters further comprises:

identifying, by the user device, a reduction order for the set of aggregation levels.

50. The method of claim 49, wherein the reduction order identifies the set of aggregation levels in increasing size.

51. The method of claim 49, wherein the reduction order identifies the set of aggregation levels in decreasing size.

52. The method of claim 1, further comprising:

detecting, by the user device, at least one of the plurality of PDCCH candidate after a determined start position or an application delay.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, the method comprising:

identifying, by a wireless access node, a sub-carrier spacing (SCS) configuration from among a plurality of SCS configurations;

selecting, by the wireless access node, a set of individual physical downlink control channel (PDCCH) detection attempt parameters from among a plurality of sets of individual PDCCH detection attempt parameters depending on the identified SCS configuration;

setting, by a wireless access node, PDCCH detection attempt parameters for a user device by:

setting a total PDCCH detection attempt number no larger than a predetermined maximum total PDCCH detection attempt number according to the selected set of individual PDCCH detection attempt numbers; and transmitting, by the wireless access node to the user device, at least one of:

the PDCCH detection attempt parameters;

one or more DCIs according to the PDCCH detection attempt parameters; or at least one PDCCH according to the PDCCH detection attempt parameters.

2. The method of claim 1, further comprising:

generating, by the wireless access node, the one or more DCIs with an initial DCI size;

truncating or zero padding, by the wireless access node, the initial DCI size to a final DCI size corresponding to a total DCI size monitoring number or a specified DCI size monitoring number.

3. The method of claim 1, wherein setting the PDCCH detection attempt parameters further comprises:

setting a total DCI size monitoring number to one; or at least one of: setting the total DCI size monitoring number to two corresponding to a first DCI size and a second DCI size, or setting a specific DCI size monitoring number to one corresponding to a third DCI size.

4. The method of claim 1, wherein setting the PDCCH detection attempt parameters further comprises at least one of: setting a total DCI size monitoring number to three or setting a specific DCI size monitoring number to two.

5. The method of claim 1, wherein setting the PDCCH detection attempt parameters is according to one or more of: a number of DCI sizes; a number of search spaces; a number of DCI formats; a type of search space; a coverage level; an aggregation level; or a number of PDCCH candidates.

6. The method of claim 1, further comprising, setting a set of DCI formats for each DCI size corresponding to at least one of a total DCI size monitoring number or a specific DCI size monitoring number.

7. The method of claim 1, wherein setting the PDCCH detection attempt parameters for the user device is further by at least one of: setting a total DCI size monitoring number to no larger than a predetermined maximum total DCI size monitoring number, or setting a specific DCI size monitoring number to no larger than the predetermined maximum specific DCI size monitoring number according to a number of search spaces.

8. The method of claim 1, further comprising:

determining, by the wireless access node, a statistic associated with DCI sizes of the one or more DCIs; and determining, by the wireless access node, at least one of a total DCI size monitoring number or a specific DCI size monitoring number based on the statistic.

9. The method of claim 1, further comprising:

determining, at least one of a total DCI size monitoring number or a specific DCI size monitoring number based on:

a number of DCI sizes of the one or more DCIs before a DCI size alignment of the DCI sizes; or one or more DCI formats of the one or more DCIs on each PDCCH occasion or on each target slot.

10. The method of claim 1, further comprising:

determining, by the wireless access node, at least one of a total DCI size monitoring number or a specific DCI size monitoring number based on:

one or more predetermined DCI formats;

one or more predetermined search space types; or one or more predetermined search space types and a number of the one or more predetermined search space types.

11. The method of claim 1, wherein the total PDCCH detection attempt number is for one search space, a set of search spaces, or all search spaces in a slot.

12. The method of claim 1, wherein at least one of: setting a total DCI size monitoring number, setting an aggregation level number, or setting the total PDCCH detection attempt number comprises:

selecting a state, from among a plurality of different states, wherein each state comprises at least one of:

the total DCI size monitoring number;

the aggregation level number; or a PDCCH detection attempt number for each aggregation level of the set of aggregation levels.

13. The method of claim 1, wherein setting the PDCCH detection attempt parameters further comprises:

setting, by the wireless access node, a detection order for a set of aggregation levels, the detection order indicating an order of the aggregation levels for detecting at least one DCI or the at least one PDCCH.

14. The method of claim 1, wherein setting the PDCCH detection attempt parameters further comprises:

identifying, by the wireless access node, a reduction order for the set of aggregation levels.

15. The method of claim 1, wherein setting the PDCCH detection attempt parameters for the user device further comprises at least one of:

setting a total downlink control information (DCI) size monitoring number no larger than a predetermined maximum total DCI size monitoring number;

setting a specific DCI size monitoring number no larger than a predetermined maximum specific DCI size monitoring number;

setting a number of non-overlapped channel control elements (CCEs) for the user device to monitor no larger than a predetermined maximum number of CCEs for the user device to monitor;

setting an aggregation level number for a set of aggregation levels no larger than a configured aggregation level number; or setting a total PDCCH detection attempt number no larger than a predetermined maximum total PDCCH detection attempt number.

16. A wireless communications apparatus comprising a memory storing a plurality of instructions; and a processor configured to execute the plurality of instructions, and upon execution of the plurality of instructions, is configured to:

identify a sub-carrier spacing (SCS) configuration from among a plurality of SCS configurations;

select a set of individual physical downlink control channel (PDCCH) detection attempt parameters from among a plurality of sets of individual PDCCH detection attempt parameters depending on the identified SCS configuration;

set PDCCH detection attempt parameters for a user device by:

setting a total PDCCH detection attempt number no larger than a predetermined maximum total PDCCH detection attempt number according to the selected set of individual PDCCH detection attempt numbers;

transmit, to the user device, at least one of: the PDCCH detection attempt parameters, one or more DCIs according to the PDCCH detection attempt parameters, or at least one PDCCH according to the PDCCH detection attempt parameters.

\* \* \* \* \*